(12) United States Patent
Karales et al.

(10) Patent No.: US 6,615,939 B1
(45) Date of Patent: Sep. 9, 2003

(54) ATV TRACK CONVERSION

(76) Inventors: David Karales, 472 Victoria La., Romeo, MI (US) 48065; Daniel Karales, 1880 S. Delano, St. Clair, MI (US) 48079

( * ) Notice: Subject to any disclaimer, the term of this patent is extended or adjusted under 35 U.S.C. 154(b) by 0 days.

(21) Appl. No.: 09/991,523

(22) Filed: Nov. 16, 2001

Related U.S. Application Data

(60) Provisional application No. 60/274,047, filed on Mar. 7, 2001.

(51) Int. Cl.[7] .............................................. B62D 55/04
(52) U.S. Cl. ..................................... 180/9.26; 180/9.21
(58) Field of Search ............................... 180/9.21, 9.23, 180/9.25, 9.26, 9.3; 305/33, 34

(56) References Cited

U.S. PATENT DOCUMENTS 4,618,015 A * 10/1986 Yochum .................... 180/9.21
4,683,970 A * 8/1987 Smith ......................... 180/15
4,706,769 A * 11/1987 Latourelle et al. .......... 180/9.21
5,330,019 A * 7/1994 Cartwright ................. 180/9.21

FOREIGN PATENT DOCUMENTS

JP          04303079 A  * 10/1992    ............ B62D/55/02

* cited by examiner

Primary Examiner—Kevin Hurley
(74) Attorney, Agent, or Firm—John R. Benefiel

(57) ABSTRACT

An ATV endless track conversion using sprocket rings fit over each of the tires of the rear wheels which are inflated into a tight driving connection. A swing arm extension is pivoted to the ATV swing arm and has its own spring-shock absorber suspension in addition to the existing ATV spring-shock absorber. A return idler wheel set is mounted at the rear of the swing arm extension as well as two track band shaping wheel sets which engage track band upper and lower segments forward of the idler return wheel set to maintain the track band tension and footprint without substantial friction losses.

12 Claims, 4 Drawing Sheets

ATV TRACK CONVERSION

CROSS REFERENCE TO RELATED APPLICATIONS

This application claims the benefit of provisional application U.S. Serial No. 60/274,047, filed Mar. 7, 2001.

BACKGROUND OF THE INVENTION

This invention concerns all terrain vehicles (ATV's) used for recreational and utility purposes. These vehicles are open topped with two large rear wheels having large tread tires powered to propel the vehicle over various terrain.

While providing effective traction in most conditions, wheeled propulsion has its limitations, such as are encountered in snow and mud. Endless tracks have been used for many years in various types of vehicles intended for off road travel, and provide more effective drive in snow and other difficult terrain conditions. For example, recreational snowmobiles use endless tracks for propulsion in snow. Snowmobiles lack the maneuverability of ATV's and the slider mounting used in snowmobiles relies on the presence of snow to reduce the high friction otherwise developed in the slider guide.

There have been prior attempts to convert ATVs to a track drive so as to allow their use in snowy conditions, and thus to provide an all season vehicle.

This conversion has in the past been attempted by installing endless tracks so as to be driven by the rear wheel drive. In the past, this has been done by installing sprockets on the rear wheel axle replacing the rear wheels, as shown in U.S. Pat. No. 6,095,275. The track band is circulated around idler wheels spaced to the rear from the sprockets. See also U.S. Pat. No. 4,699,229. The tracks must have a linear footprint as they circulate in order to produce an extended ground contact developing the improved traction enabled by use of the endless track drive.

A slider guide has been used in such conversions to guide and tension each track band, similar to that in use on conventional snowmobiles. As noted above, there is a high friction loss created in the slide assembly when not used in snow, which reduces the horsepower available to drive the track bands, adversely affecting the performance of the vehicle. The use of heavy sprockets replacing the wheels and tires adds to the time and cost of carrying out the conversion.

U.S. Pat. No. 4,635,740 shows an ATV conversion in which the tracks are directly driven by the rear tires, but such engagement is not effective at high speeds and is subject to slippage in snow or mud. An auxiliary set of wheels and tires is also used in lieu of the slider assembly, but this is a costly alternative.

It is an object of the present invention to provide a low cost ATV track conversion which maximizes the performance of the vehicle by providing a track drive and support which is efficient in not generating large frictional losses even when not operated in snow, and which drives, guides and supports the track bands effectively even at high speeds.

SUMMARY OF THE INVENTION

The above object and others which will be understood upon a reading of the following specification and claims are achieved by a conversion having several unique features.

First, the drive to a pair of endless tracks includes a lightweight molded plastic sprocket ring mounted to each existing rear tire of the ATV by being slipped over a partially deflated tire, with the tire then reinflated to be expanded to tightly engage the inside of the sprocket ring to be held in place on the tire very securely. The inside of each sprocket ring has pocket features interfit with the tire tread raised areas to establish a positive drive between each tire and the associated sprocket ring.

The exterior of each sprocket ring is formed with features engaged with corresponding raised engagement features on the inside of the associated endless track band.

According to a second unique feature of the present invention, each endless track band passes around one of a pair of idler wheel assemblies supported on an auxiliary axle housing mounted to the rear of the ATV drive axle by a swing arm extension pivotally attached to the end of the ATV swing arm which mounts the rear wheel drive axle.

Each idler wheel assembly includes an angled swing link pivoted on a stub shaft projecting from a respective end of the auxiliary axle housing and coupled to a torsion spring in the auxiliary axle assembly. The idler wheel assembly includes a pair of sets of return idler wheels mounted on one arm of the angled link around which the associated endless track band is circulated to define the rearmost extent of the track band, and passing around the associated sprocket ring at the forward end of the track band.

Two sets of track shape defining wheels are also included in each idler wheel assembly, a lower set supported on the other arm of the link forward of the return idler wheel set and engaging the inside of the lower segment of the track band. The other track shaping defining wheel set is supported on a pivoted link spring urged to swing up from the angled link so that the second set of track shape defining wheels engages the inside of the upper, return segment of the associated track band.

The swing arm extension itself has a spring-shock absorber unit attached at one end thereto, connected to the ATV swing arm to create an independent suspension for the idler wheel assemblies which augments the main ATV suspension, normally including the swing arm and an ATV spring and shock absorber unit. The provision of an auxiliary track-idler wheel suspension is a third unique feature of the track conversion according to the invention, allowing the track to be held in proper contact with the ground even at high speeds.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
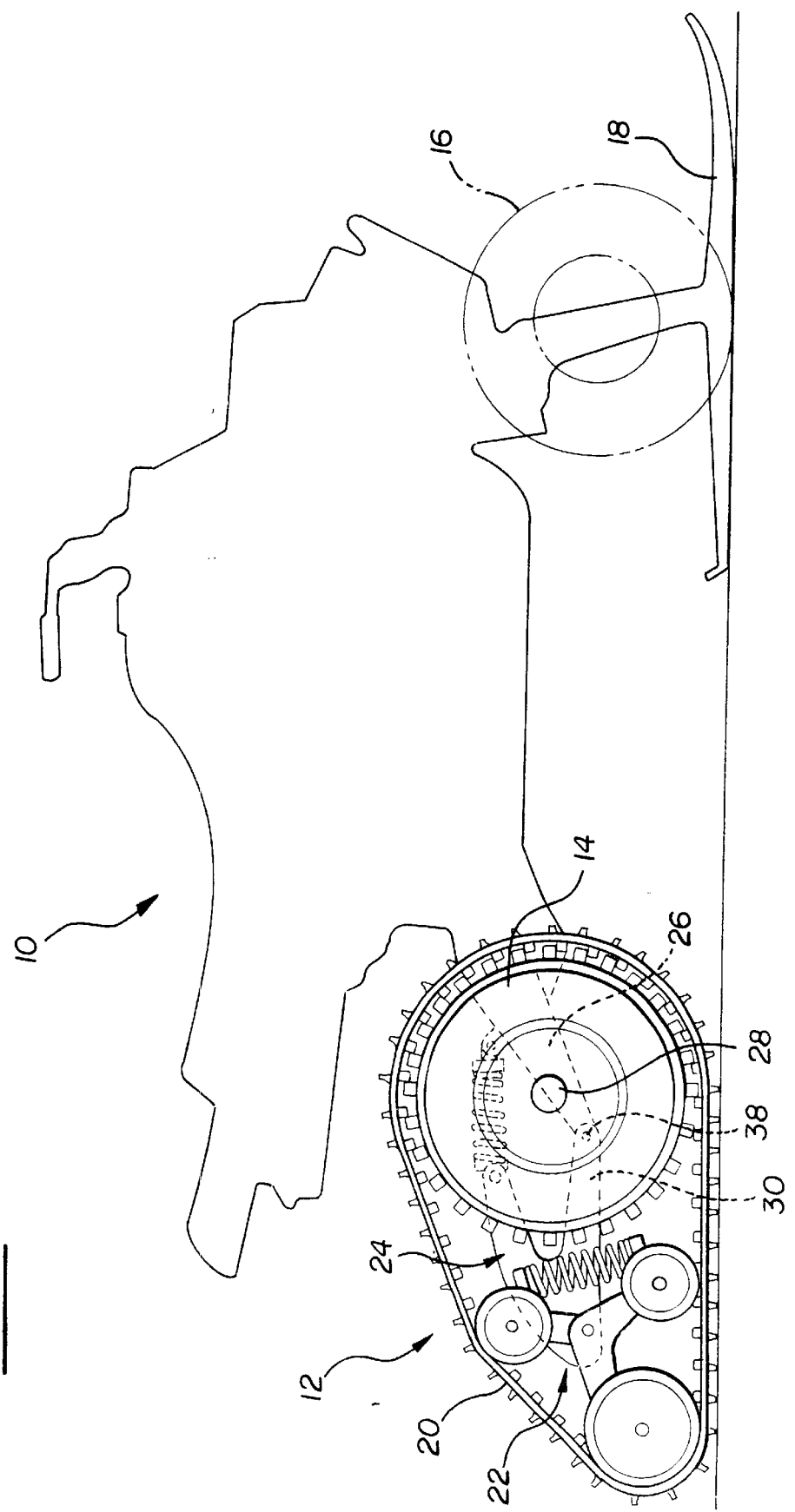
FIG. 1 is a side elevational outline view of an ATV with a detailed view of the track conversion according to the present invention with front ski replacements shown for the original front wheels, shown in phantom lines.

Referring to FIG. 1, an ATV vehicle 10 is shown in outline, equipped with a track conversion 12 which incorporates the original rear wheels 14 (with the tires). Since this conversion may be intended for when the ATV is used in snow, the front wheels 16 (shown in phantom lines) may be replaced with skis 18 as are used with snowmobiles.

The track conversion includes a pair of endless track bands 20 each driven by a respective rear wheel around which the track band 20 passes, which also passes around an associated one of a pair of idler wheel assemblies 22 to the rear of the rear wheels 14. The idler wheel assemblies 22 are both supported on a swing arm extension 24 trailing and pivotally mounted to the rear end of the existing ATV swing arm 26 which mounts the rear wheel axle 28 to allow movement thereof in the manner known in the art.

Figure 2:
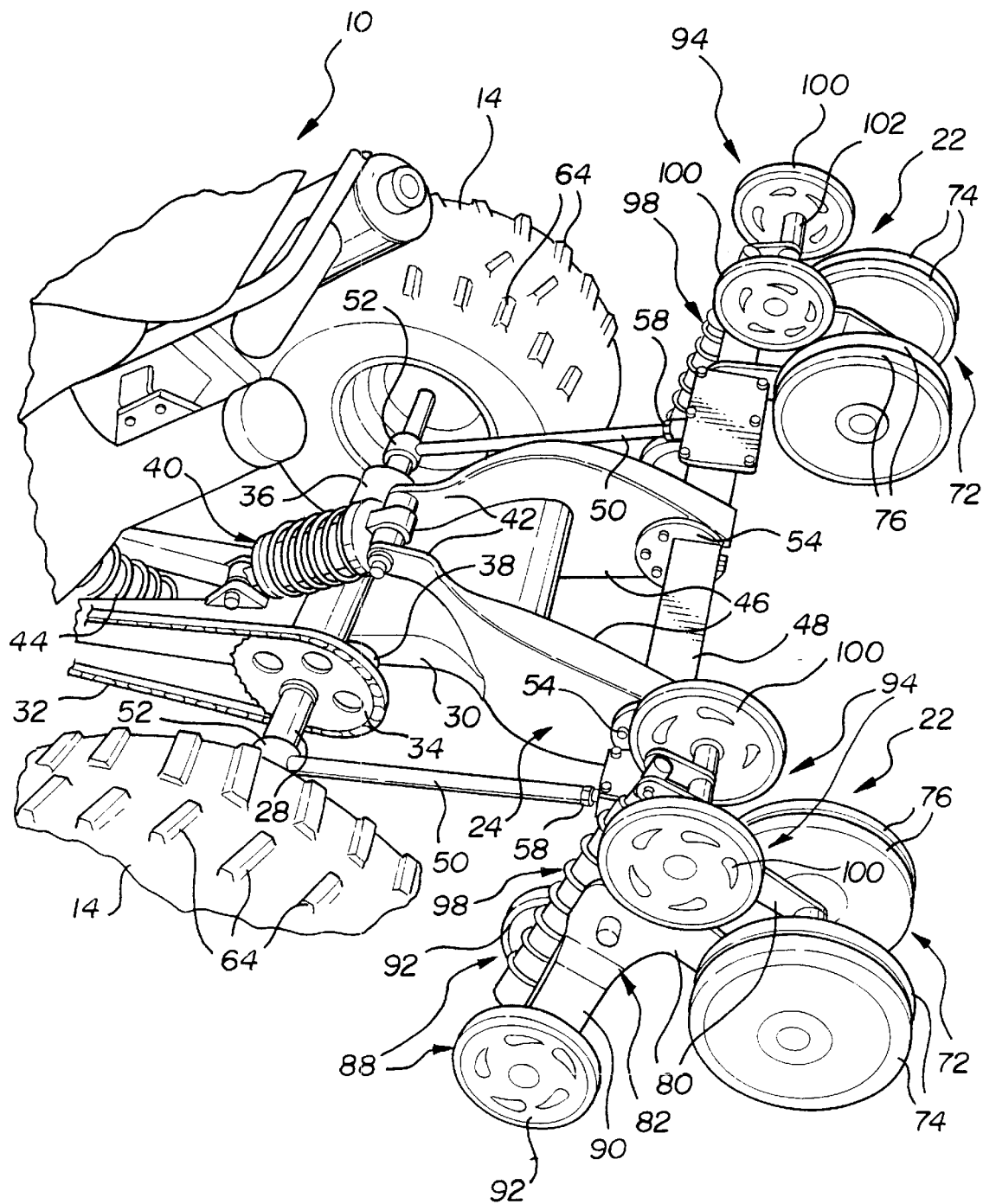
FIG. 2 is a downward perspective fragmentary view from one side of an ATV having the track conversion according to the invention but with the track bands removed.

The swing arm extension 24 has a lower tongue 30 which is pivotally mounted to the trailing end of the swing arm 26. The pivotal attachment of the swing arm extension 24 to the ATV swing arm 26 varies in its details with the particular ATV vehicle. The rear wheel drive axle 28 are driven by a chain 32 and sprocket 34 (FIG. 2). The ATV axle housing 36 normally is adjustably mounted to the swing arm 26 to enable tightening the chain 32, and the particular pivotal attachment 38 of the tongue 30 for a given vehicle must be designed to not interfere with the adjustment movement of the ATV axle housing 36.

A combination shock absorber-spring 40 is connected at one end to a clevis 42 projecting up over the tongue 30 of the swing arm extension 24 and at the other end to the swing arm 26 at a point located to the rear of the ATV swing arm combination spring-shock absorber 44.

The swing arm extension 24 also includes a pair of rearwardly extending members 46, the ends of which hold jaw brackets 54 which in turn adjustably receive an auxiliary axle housing 48.

A pair of stabilizer rods 50a each connected at their forward and to a respective ball bearing 52 received on a respective segment of the rear wheel drive axle 28 and at their rear end to the auxiliary axle housing 48. The stabilizer rods 50 reinforce and stabilize the positioning of the auxiliary axle housing 48 with respect to the drive axle 28.

Figure 4:
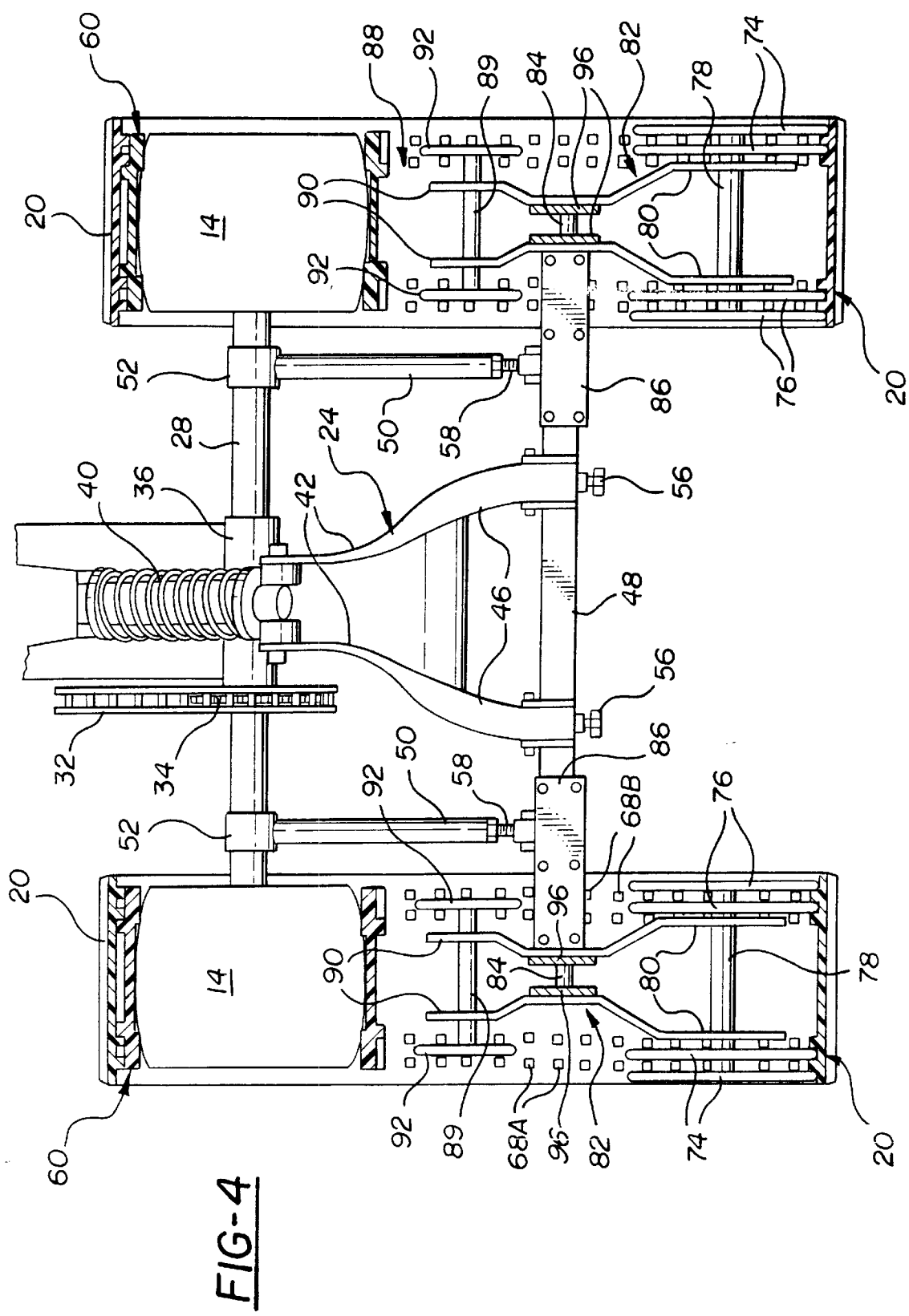
FIG. 4 is a plan view in partial section of the track conversion components and the associated components of the ATV.

The position of auxiliary axle housing 48 may be adjusted within receiving jaw brackets 54, with a threaded end 58 on each rod stabilizer 50 allowing tensioning of the track bands 20 (adjusting bolts 56 shown in FIG. 4).

In order to create a positive drive to the endless track bands 20, a pair of sprocket rings 60 are provided installed on each tire 14 by partially deflating the same and slipping a sprocket ring 60 over the tire 14 and reinflating the same. The sprocket rings 60 are preferably molded using a high strength material such as ultra high molecular weight plastic (UHMW).

The interior of each of the sprocket rings 60 are formed with axially extending features 62 which are located so as to be engaged with the particular tire tread features 64 (FIG. 2) of the ATV being converted to insure a positive connection. The exterior of the sprocket rings 60 is also formed with axial features 66 configured and spaced to define pockets 69 receiving the inner drive features 68 of the associated endless track band 20.

The endless track bands 20 are of the same type as have previously been used in snowmobiles, and have molded exterior cleats 70 to gain better traction in snow, mud, etc.

Figure 3:
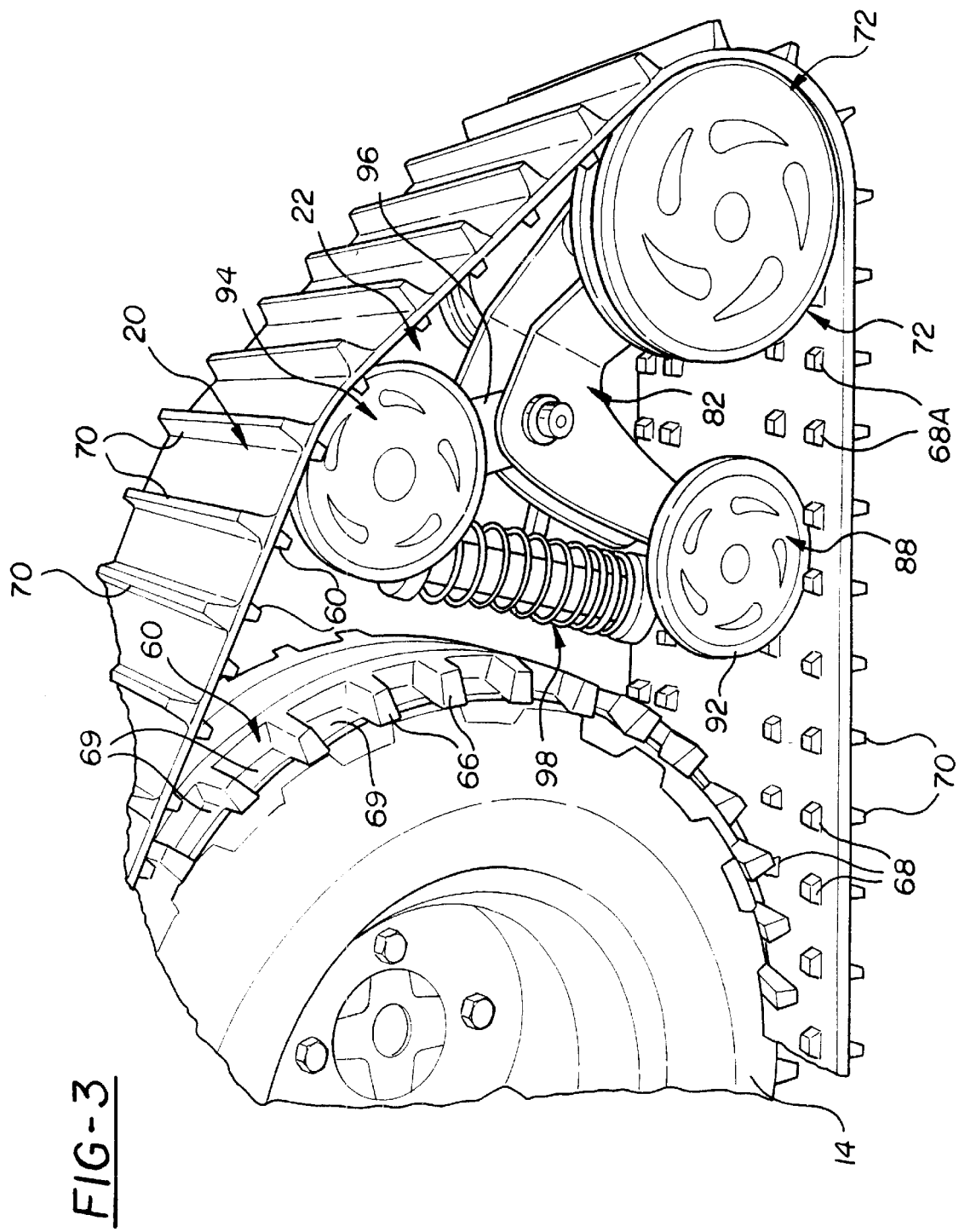
FIG. 3 is a fragmentary perspective view of rear portions of the ATV track conversion according to the present invention.

The idler wheel assemblies 22 define the shape of the endless track bands 20 as the bands circulate as the ATV traverses the terrain. A main idler wheel set 72 is included, located rearmost from the wheels 14, and the associated track band 20 passes around the same in returning to the sprocket ring 60. The return idler wheel set 72 may include two spaced pairs of wheels 74, 76 which each straddle the row of outermost features 68A, 68B on the bands 20 as shown in FIG. 3, and are rotatably supported on an axle 78 carried on one set of arms 80 on angled links 82. This straddling engagement tends to prevent the lose of a track band 20.

The angled links 82 are fixed to rotate with stub axles 84 projecting from a respective end of housing 48. The stub axles 84 are bonded to an elastomeric mass contained within square cavities in housing 48 covered with plates 86 to be prevented from rotating. This creates a torsional spring acting to generate a restoring torque while allowing wind up of the links 82 and swinging of the arms 80.

A lower shape band defining wheel set 88 is located forward of return wheel set 72, rotatably supported by an axle 89 on second arm 90 of each of the angled links 82 the return idler wheel set 72.

The lower band shape defining wheel set 88 is swung on the links 82 as the return idler wheel set 72 is swung. An axle shaft 90 provides rotational support for the individual wheels 92 in the set 88. The wheels 92 may be received between respective rows of track features 68.

A set 94 of upper track band shape defining wheels 100 is supported on a pair of upwardly angled arms 96 freely swingable on the shafts 84. A spring 98 is mounted to urge the arms 96 to swing up and force wheel set 94 into engagement with the inside of the associated track band 20.

The wheel set 94 comprises a pair of closely spaced wheels 100 supported on either end of an axle 102.

The wheels 100 may also run between the rows of features 68 on the inside of the track band 20 to help the retention of the track bands 20 on the vehicle.

The wheels of each set 74, 88, and 94 are of a light weight construction commonly used to support snowmobile tracks.

As the terrain varies, the return idler wheel set 72 may lift up, allowing the links 82 to rotate counterclockwise, causing wheel set 88 to push down into the track band 20, while wheel set 94 rotates down, the net effect to keep the track band 20 taut and its shape roughly triangular and to maintain tension.

If the return idler wheel set 88 moves up, the wheel set moves down and wheel set 94 moves up.

Thus, the three wheel sets 72, 88, 94 arranged in a triangle insure that the extended track footprint on the surface is maintained as the ATV traverses any type of terrain, and the tension of track bands 20 is maintained despite up and down motion of the return wheel set 22.

The idler wheel assembly 22 has its own suspension acting independently of the ATV suspension which establishes superior performance. The swing arm extension 24 can swing up against the resistance of the combination spring-shock absorber 40, and this does not offset the ability of the rear wheel 14 to swing up to accommodate the dynamics of the ATV as it travels at high speeds across rough terrain.

The frictional losses are minimal even when the ATV is not being driven in snow, to provide high performance over all types of terrain and conditions. The track bands 20 are securely retained and positively driven to allow operation at high speeds.

What is claimed is:

1. An ATV conversion for providing an endless track band for each rear wheel of an ATV comprising:

a sprocket ring received over a tire on said rear wheel, said tire in driving engagement therewith, said sprocket ring having drive features on the exterior thereof;

a pair of endless track bands each received over a respective sprocket ring and having inner engagement features engaging said sprocket ring exterior engagement features to be driven thereby;

an idler return wheel set for each rear wheel having a mounting located to the rear of each rear wheel of said ATV, each endless track band also passing around said idler return wheel set.

2. The ATV conversion according to claim 1 wherein the inside of each of said sprocket rings are also formed with features received between tread features of said respective tire to be positively engaged therewith.

3. The ATV conversion according to claim 1 wherein said ATV includes a swing arm mounting said rear wheels, and wherein said idler return wheel set is mounted on a swing arm extension trailing said swing arm and pivoted to a portion of said swing arm whereat said rear wheels are supported thereon.

4. The ATV conversion according to claim 3 further including a combination spring-shock absorber mounted to act between said swing arm and said swing arm extension to resist upward pivoting of said swing arm extension on said swing arm, whereby providing a return idler wheel set suspension.

5. The ATV conversion according to claim 4 wherein said return idler wheel set mounting includes an auxiliary axle housing carried at a trailing end of said swing arm extension, an axle end projecting from either end thereof, each providing support for a respective return idler wheel set.

6. The ATV conversion according to claim 5 wherein a link is attached to each axle end and having an arm extending rearwardly therefrom, an idler return wheel set rotatably mounted on each link arm, a torsion spring resiliently resisting rotation of said ends.

7. The ATV conversion according to claim 6 further including a pair of lower track band shape defining wheel sets each mounted forwardly of a respective one of said return idler wheel sets and engaging the inside of a respective track band.

8. The ATV conversion according to claim 7 wherein each of said links includes a forwardly angled arm on which a respective lower track band shape defining wheel set is rotatable mounted.

9. The ATV conversion according to claim 8 further including a pair of upper track band shape defining wheel sets engaging the inside of a return segment of said track band, each mounted on an upwardly angled link pivoted on a respective stub axle and a spring urging each upward link to swing up towards the inside of an upper segment of a respective track band.

10. The ATV conversion according to claim 5 further including a pair of stabilizer members connecting rear wheel axles of said ATV to said auxiliary housing on either side of said pivotal connection between said swing arm and swing arm extension.

11. The ATV conversion according to claim 5 wherein said auxiliary axle housing is adjustably mounted to said swing arm extension to allow tension adjustment of said track bands.

12. The ATV conversion according to claim 1 further including a pair of skis mounted to the front of said ATV replacing the front wheels of said ATV.

* * * * *